United States Patent Office 3,317,391
Patented May 2, 1967

3,317,391
COMPOSITION FOR TREATMENT OF ANGINA PECTORIS AND PROCESS FOR PREPARING SAME
Louis W. Granirer, 90—36 149th St., Jamaica, N.Y., and Elisabeth Adam, New York, N.Y.; said Adam assignor to said Granirer
No Drawing. Filed June 24, 1963, Ser. No. 290,222
11 Claims. (Cl. 167—74)

The present application relates to a new and improved combination, preparation or compositions for the relief of symptoms of angina pectoris and an improved method of making said preparation.

The new and improved preparation is prepared by combining an extract of human placenta, certain "sulfa" or sulfonamide drugs, aspirin, and desiccated and undefatted beef liver powder.

The present application is a continuation-in-part of United States Ser. No. 785,340, filed in the names of the instant inventors on Jan. 7, 1959, now abandoned.

The suitable sulfa drugs may be characterized as being sulfonamides having the following formula and derivatives of same.

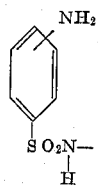

The important features of the above compounds are that the sulfa is directly linked to the benzene ring and the —$NH_2$ group is similarly attached thereto. Preferably the —$NH_2$ is in the para position. Derivatives of such compounds include materials wherein various substituent groups are attached to the nitrogen of the —$SO_2N$— group. Thus, a wide variety of sulfonamide type compounds and derivatives thereof may be suitable.

More specifically, the following classes of sulfonamide derivatives can be employed.

CLASS I

*Rapidly absorbed and rapidly excreting sulfonamide type compounds*

Sulfadiazine, sulfamerazine, sulfamethazine, sulfacetamide, sulfisoxazole, salicylazosulfapyridine.

CLASS II

*Rapidly absorbed but slowly excreted sulfonamide type compounds*

Sulfamethoxypyridizine, sulfamethoxypyrimidine, sulfaethylthiadiazole.

CLASS III

*Poorly absorbable sulfonamide type compounds*

Succinyl sulfathiazole, pthalylsulfathiazole, pthalylsulfacetamide, sulfaguanidine.

The oral active hypoglycemic sulfonamides and diuretic sulfonamides are unsuitable for the practice of the present invention.

Each dose or capsule containing the present composition normally will contain .1 to .5, preferably .1 to .3 grams of total therapeutic composition (sulfonamide type compounds, aspirin, powdered beef liver, and placenta extract). The relative proportions of the ingredient in each capsule or dosage are as follows based on total weight of ingredients.

| | Wt. percent |
|---|---|
| Sulfonamide type compound | 5 to 25 |
| Aspirin | 25 to 50 |
| Beef liver | 5 to 25 |
| Placenta residue | 0.25 to 2 |

It has been found that the final composition obtained normally will only contain a fraction, e.g., 10% of the initially employed sulfonamide drug used in its preparation. The actual amount of sulfonamide drug per tablet will normally range from about 0.005 to 0.1, preferably 0.025 to 0.075 grams. The amount of sulfonamide employed is approximately 10 times less than the amount usually prescribed in normal therapeutic dosages over long periods of time. For example 0.5 gram to 1 gram dosages of sulfadiazine have been employed for long periods of time in therapy with no side effects (see page 1285, Pharmacological Basis of Therapeutics, Second Edition, Louis F. Goodman and Alfred Gilman, McMillan & Company, 1955, New York).

A second one of the ingredients of the new composition is formed by extraction from fresh human placentas, placentas being extracted when they are in finely ground form. The finely ground, fresh human placentas are extracted with an acidified solvent of methyl alcohol and water. This solvent mixture is acidified to a pH of 2.7 before using said solvent mixture, by adding a suitable mineral acid such as concentrated sulfuric acid to said solvent mixture of methyl alcohol and water.

Human placenta contains some alkaline material. Hence when said acidified solvent is kept mixed with said finely ground and fresh human placenta during a suitable extraction period, the pH of the mixture may be 5.4 at the end of the extraction period. Typically, the extraction of human placenta and treatment of the extract may be conducted as follows:

EXTRACTING THE PLACENTAS

The solvent is a mixture (by volume) of 75% of either methyl alcohol or ethyl alcohol, and 25% of water. This solvent mixture is acidified before using it, to a pH of 2.7, by adding concentrated sulfuric acid. This sulfuric acid is a mixture of said acid with water, which may have 62.2% to 98% by weight of sulfuric acid.

One kilogram of the fresh and finely ground human placentas is mixed with one liter of said acidified solvent, during a mixing period of two hours, under normal atmospheric pressure of 760 millimeters of mercury. This mixing step is done at 20° C.–30° C. This mixing step results in a mixture which has a red-brown color. This mixture has a liquid fraction and a solid precipitated fraction. At the end of this mixing period of two hours, the pH of the mixture is usually 5.4.

This mixture is then allowed to stand without agitation, during two standing periods. Each of said standing periods is 24 hours to 48 hours. The mixture is thus allowed to stand under refrigeration during each said period at about 0° C., but without freezing the mixture. This refrigeration is used in order to prevent deterioration of organic matter.

At the end of the first standing period of 24 hours to 48 hours in the refrigerator, the pH of the liquid fraction of the mixture is tested. It is usually 5.4 to 6.4. If the pH value is above 5.4 at the end of this first standing period for 24 hours to 48 hours, the pH value of the liquid fraction of the mixture is immediately lowered to 5.4, by adding said concentrated sulfuric acid.

At the end of this first standing period, and after the pH has been lowered to 5.4, if such lowering of pH is necessary, the liquid fraction of the extract is immediately separated from the precipitated part of the extract, as by ordinary filtration, to produce a first liquid fraction or first filtrate.

This first liquid fraction or first filtrate is allowed to stand without agitation in said refrigerator at about 0° C., but without freezing, during a second standing period of 24 hours to 48 hours.

At the end of the second standing period, the liquid fraction of the extract is immediately separated from any solid precipitate which may have been formed during the second standing period, as by ordinary filtration or centrifuging. This results in a second filtrate or second liquid fraction which has a pH which is usually 4.2 to 5.4. This second filtrate or second liquid fraction has a clear, straw-yellow color. This second liquid fraction is free from material which is preciptated under acid condition.

Ammonium sulfate is immediately optionally dissolved in this clear, straw-yellow, second liquid fraction. If the optional ammonium sulfate is added, 2.5 grams of the anhydrous ammonium sulfate are dissolved per liter of this clear, straw-yellow, second liquid fraction. If the optional ammonium sulfate is dissolved in this straw-yellow liquid fraction, there is no preciptation and the pH value of said straw-yellow liquid fraction remains substantially unchanged.

The pH of this second, straw-yellow liquid fraction of the extract of the placenta is then adjusted to a value above 7, such as a pH value of 9.6, by reacting said second liquid fraction with an added alkaline precipitating agent, such as ammonium hydroxide. This ammonium hydroxide reactant is an aqueous solution of ammonia which has 9 grams to 10 grams of dissolved ammonia per 100 cc. of water. The precipitate which is formed by the addition of this aqueous solution of ammonia is separated by filtration at normal room temperature of 20° C.–30° C. This filtrate has a pH of 9.1. The resultant filtrate is further treated.

Said method of extracting the human placentas is fully disclosed in the Adam and Granirer application Ser. No. 491,874, filed March 3, 1955. This application has been issued as U.S. Patent No. 2,907,695 on October 6, 1959.

The method of treating said resultant filtrate which results from the method disclosed in said Adam and Granirer application Ser. No. 491,874, filed March 3, 1955 now issued as U.S. Patent 2,907,695, is disclosed in the Adam and Granirer application Ser. No. 530,611, filed August 25, 1955, now abandoned.

As above noted, the pH of the resultant filtrate which results from the method described in application Ser. No. 491,874, is a pH of 9.1. This filtrate has a specific gravity of 0.967. As described in said application Ser. No. 530,611, the filtrate is evaporated to produce a dry residue which is conveniently designated as the crude residue. This dry residue can be used herein, either with or without purification. If this initial crude dry residue is purified for the purposes of this invention, the purpose of the optional purification is mainly to remove up to 90% by weight of inorganic material which results from previous steps.

If this crude dry residue is purified for the purposes of our invention, the crude dry residue is treated with methanol at 20° C., this dissolving the desired ingredients from the crude dry residue. For this purpose, the weight of the methanol may be 75% of the weight of the crude residue. The methanol is then evaporated from the solution, leaving a selected part of said crude dry residue which is soluble in distilled water.

As a specific example of the further treatment of this selected part of the crude residue, 12 grams of this selected part are dissolved in 600 cubic centimeters of distilled water. Then 28 grams of activated charcoal are gradually added to this aqueous solution, and this mixture is heated for two hours at 37.5° C., under standard atmospheric pressure of 760 millimeters of mercury.

At the end of this heating period of two hours, the liquid part of the mass is separated by filtration under suction.

The filtrate is evaporated to dryness on a water bath, thus providing the purified residue which is one ingredient of the improved composition, according to the preferred embodiment.

PROCESS OF PREPARING COMPOSITION

In the following description the calculation of the improved compositions of the present invention are on the basis of 200 grams of purified residue being employed in each preparation. The weight of purified dry residue is 30 to 50% by weight of the crude dry residue.

Two hundred grams of said purified residue are dissolved in 400 cc. of distilled water at 120° F., under ordinary atmospheric pressure. All the steps described herein are done under ordinary atmospheric pressure of 760 millimeters of mercury.

The aqueous solution of either the pure residue or the crude residue has a brown color. In general, the crude residue or the purified residue is soluble in twice its weight of distilled water at 120° F., and such solution has a pH of 4.5.

The aqueous solution of the residue (either crude or purifiied) is supplemented by suspending certain supplemental drugs in very fine powder form in said aqueous solution, using agitation to make a uniform mixture, and then finally evaporating the water so as to produce a fine and uniform mixture of said crude or purified residue and the supplemental drugs. Additional water may be added when required, as later described, in order to make a paste from which the water is evaporated. The water is evaporated from this paste during an evaporation period of four days at 50° C.–55° C. with occasional mixing.

To 200 grams of the purified residue in 400 cc. of water there is then added the additional components of the present compositions. Typically 500 to 2500 grams of a sulfonamide type compound described previously is then added. The sulfonamide type compound may be a single compound or a plurality of compounds, such as "triple sulfonamide," described on pages 917 of the 1952 edition of the Merck Index. The triple sulfonamide mixture contains sulfamerazine, sulfadiazine and sulfamethazine, and is preferred.

Enough water is added together with the sulfonamide compounds in order to form a paste. This additional water is distilled water which is added at 50 to 55° C. Five liters of water are added in this specific example in which 200 grams of the purified residue are the basis of calculation, when said 200 grams are dissolved in 400 cc.'s of water.

The paste which is thus formed has a slight tan color. The pH of said paste is 4.6.

The second additive is five kilos of aspirin powder. Aspirin is a well-known compound which is described in page 13 of said "The Merck Index." It is acetyl salicylic acid. As stated on said page 13, this compound can be hydrolyzed into salicylic acid and acetic acid. In this example, the weight of the aspirin is 25 times the weight of the purified residue. If necessary, additional distilled water may be added, in order to make a paste of proper consistency. Five liters of water may be added for this purpose, together with the aspirin powder. The pH of said paste is 3.8.

The third additive in this example is 2500 grams of powdered whole beef liver, desiccated and undefatted (N.F.). This is a well-known pharmaceutical preparation. This beef liver powder is free of excess blood and connective tissue. This desiccated beef liver powder has a very dark-brown color, and it is insoluble in water. In this example, an additional five liters of distilled water are added at 50° C.–55° C. together with the 2500 grams of said beef liver powder, in order to make a paste of proper consistency. The beef liver powder and water are added, with thorough intermixing.

The resultant final paste is allowed to stand, without mixing, for two weeks at ordinary room temperature of 20° C.–25° C. This is done in a covered, aseptic glass jar, without any bacterial contamination. One of the results of this standing period of two weeks is to produce a stable paste whose ingredients do not separate. The color of this stable paste is a light tan, mixed with many pin-point brown granules.

At the end of this standing period of two weeks, the pH of the uniform paste mixture is 4. There is little loss of weight during this standing period because the glass jar is kept covered, thus preventing evaporation of water from this paste.

It is believed that as a result of this standing step, some of the enzyme material of the liver powder is split or one of the enzymes is activated.

At the end of this standing period of two weeks, the mass is thoroughly mixed in a pan at 20° C.–30° C., in order to incorporate any supernatant liquid which may have separated from the solid material of the paste. The result of this mixing is a thick, pourable, uniform paste.

This paste is poured into a shallow pan in which the height of the paste is about 25 millimeters. The water is evaporated in a first drying step from the paste in said pan at 50° C.–55° C., under said normal atmospheric pressure of 760 millimeters of mercury, in order to produce a desiccated or substantially desiccated material.

During this first drying step, there is considerable odor of acetic acid, which results from the decomposition of the aspirin. The liberation of the acetic acid results in a suitable low pH. The salicylic acid which is liberated by the decomposition of the aspirin, probably reacts, in combination with the "sulfa" drug or drugs and the placental extract, to split the enzymes of the beef liver powder. The color of the paste or mixture changes to a deep, brown, homogeneous color, within the first twenty-four hours of the first drying step. The first residue which results from this first drying step is within the scope of the invention, but it is improved by the subsequent drying steps. The temperature of 50° C.–55°C. and the drying period of at least 24 hours are important, in order to split the enzymes of the beef liver powder.

The first dry residue or substantially dry residue, which results from said first drying step, is again mixed with distilled water to make a thick, pourable paste. This paste is subjected, in a layer which has a height of about 25 millimeters, to a second drying step at 50° C.–55° C., under said normal atmospheric pressure, in order to produce a second dry or substantially dry residue. The odor of acetic acid is perceptible during the second drying step, so that there is some further splitting of the enzymes.

The second dry or substantially dry residue which results from the second drying step is again mixed with water to make a thick, pourable paste.

This paste is dried in a third drying step in the form of a layer which has said height at 45° C., under said normal atmospheric pressure. There is no odor of acetic acid during this third drying step.

At the end of the third drying step, the pH of the dry or substantially dry residue is 2.8. The dry residue which results from the third drying step is the end-product, which is pulverized in the usual manner for filling into capsules, and the pulverized end-product is put into capsules in the usual manner. The color remains deep brown and the mass remains granular through all the drying steps.

The daily dosage of the new end-product drug in said capsules, for an average adult whose weight is 60 kilos, may be two to three capsules daily, each capsule containing 0.1 to 0.3 gram of the end product.

As noted previously, the crude residue may be one of the ingredients of the new composition. The chemical formula and chemical structure of this ingredient are unknown. This crude residue ingredient is conveniently defined as the solute of the liquid portion of the reaction product between ammonium hydroxide as one reactant, and another reactant which is the liquid portion of an extract of the human placenta, said solute being dissolved in an acidified solvent which is a mixture of substantially 75% of methanol and 25% of water by volume, said acidified solvent having an original pH of 2.7.

If the purified residue is one of the ingredients of the new composition, said purified residue is conveniently defined as the fraction of said crude residue which is substantially free from inorganic material.

The improved composition is conveniently defined as the dry residue of the aqueous paste reaction product between the crude residue or purified crude residue, sulfonamide type compounds specified previously, aspirin, and whole beef liver, said whole beef liver being preferably desiccated and undefatted.

Example 1

A composition of the present invention was prepared in the aforesaid manner. Two hundred grams of purified residue, 2.5 kilos of "triple sulfonamide" (equal weight part mixture of sulfamerazine, sulfadiazine and sulfamethazine), 2.5 kilos of desiccated and underfatted powdered whole beef liver and 5 kilos of aspirin were employed in the manner described previously in forming the ultimate dry product which was pulverized in the usual manner for filling into capsules. Each capsule contained 0.3 gram of total composition.

Clinical tests were then performed to take the efficacy of the present compositions, the present compositions being compared with a placebo of milk sugar.

The procedure employed in the clinical testing was to first determine the nitroglycerine intake normal to each of the patients tested, to then administer placebos for an interval, and during this interval, determine the reduction in nitroglycerine tablet intake as previously determined; and to then put the patients on the composition of the invention for an interval, and to determine reduction in intake of nitroglycerine tablets. Thus the testing included three intervals, namely, a nitroglycerine tablet interval, a placebo interval, and a placental preparation interval. The placebos were milk sugar.

Particular conditions of the tests were as follows:

(a)

| | Weeks |
|---|---|
| Time on nitroglycerine tablets | 4 |
| Time on placebo | 4 |
| Time on placental preparation | 4 |

(b) During all of the test intervals, the patients took nitroglycerine tablets as desired by them. The placebo and the placental preparation, were each administered in the form of capsules, and the placebo and placental preparation capsules had exactly the same appearance. The placebo capsules and the placental capsules were each administered at the rate of one capsule orally after breakfast, lunch and the evening meal. The placental capsule is 0.3 gram of the composition.

The results for the testing are set forth in Table I hereof. In this table, response is indicated in accordance with the following notation:

| Excellent | ++ |
|---|---|
| Moderate | + |
| None | 0 |

TABLE I

| Patient | Normal nitroglycerine intake [1] | Condition before test [2] | On placebo therapy [3] | On placenta preparation [4] | Response | Reason for poor response [5] |
|---|---|---|---|---|---|---|
| 1 | 4 | 1-3 | 4 | 0 | ++ | |
| 2 | 6 | 3 | 5 | 0 | ++ | |
| 3 | 8 | 3 | 8 | 3 | ++ | |
| 4 | 3 | 1-3 | 3 | 1 | ++ | |
| 5 | 9 | 2 | 9 | 4 | 0 | A. |
| 6 | 4 | 1 | 4 | 0 | ++ | |
| 7 | 5 | 3 | 5 | 0 | ++ | |
| 8 | 5 | 3 | 5 | 5 | ++ | |
| 9 | 7 | 1-3 | 3 | 0 | ++ | |
| 10 | 5 | 2 | 10 | 0 | ++ | |
| 11 | 10 | 2 | 4 | 0 | ++ | |
| 12 | 4 | 1-3 | 10 | 0 | ++ | |
| 13 | 11 | 1 | 7 | 6 | 0 | C. |
| 14 | 6 | 3 | 10 | 0 | ++ | |
| 15 | 10 | 1-3 | 4 | 0 | ++ | |
| 16 | 3 | 3 | 6 | 6 | 0 | B. |
| 17 | 6 | 1 | 6 | 0 | ++ | |
| 18 | 4 | 2 | 6 | 1 | ++ | |
| 19 | 12 | 2 | 6 | 0 | ++ | |
| 20 | 5 | 1 | 4 | 0 | ++ | |
| 21 | 20 | 2 | 18 | 0 | ++ | |
| 22 | 6 | 1 | 6 | 0 | ++ | |
| 23 | 4 | 1 | 4 | 1 | ++ | |
| 24 | 8 | 1 | 4 | 0 | ++ | |
| 25 | 6 | 1 | 6 | 0 | ++ | |
| 26 | 8 | 1 | 6 | 4 | 0 | B. |
| 27 | 4 | 1 | 4 | 0 | ++ | |
| 28 | 9 | 3 | 9 | 0 | ++ | |
| 29 | 4 | 1-3 | 4 | 0 | ++ | |
| 30 | 8 | 2 | 7 | 0 | ++ | |
| 31 | 12 | 3 | 12 | 0 | ++ | |
| 32 | 8 | 1-3 | 7 | 0 | ++ | |
| 33 | 7 | 1 | 6 | 2 | ++ | |
| 34 | 10 | 2 | 9 | 0 | ++ | |
| 35 | 12 | 2 | 10 | 0 | ++ | |
| 36 | 9 | 1-3 | 7 | 0 | ++ | |
| 37 | 7 | 2 | 7 | 0 | ++ | |
| 38 | 9 | 2 | 2 | 0 | ++ | |
| 39 | 6 | 1 | 6 | 3 | 0 | C. |
| 40 | 3 | 1 | 5 | 0 | ++ | |
| 41 | 4 | 3 | 4 | 3 | ++ | |
| 42 | 6 | 1 | 6 | 0 | ++ | |
| 43 | 5 | 1 | 6 | 3 | ++ | |
| 44 | 4 | 1 | 4 | 0 | ++ | |
| 45 | 3 | 2 | 3 | 0 | ++ | |
| 46 | 6 | 1-3 | 6 | 0 | ++ | |
| 47 | 5 | 1 | 4 | 0 | ++ | |
| 48 | 8 | 1 | 9 | 1 | ++ | |
| 49 | 4 | 2 | 4 | 0 | ++ | |
| 50 | 5 | 3 | 5 | 0 | ++ | |
| 51 | 8 | 2 | 7 | 0 | ++ | |
| 52 | 6 | 1 | 1 | 0 | ++ | |
| 53 | 5 | 2 | 4 | 0 | ++ | |
| 54 | 7 | 2 | 2 | 0 | ++ | |
| 55 | 12 | 1 | 11 | 10 | 0 | C. |
| 56 | 10 | 2 | 9 | 0 | ++ | |
| 57 | 6 | 1-3 | 5 | 2 | ++ | |
| 58 | 4 | 1-3 | 4 | 0 | ++ | |
| 59 | 10 | 3 | 3 | 0 | ++ | |
| 60 | 8 | 3 | 8 | 4 | ++ | |
| 61 | 18 | 1 | 16 | 0 | ++ | |
| 62 | 9 | 3 | 8 | 4 | 0 | O. |
| 63 | 6 | 2 | 2 | 0 | ++ | |
| 64 | 8 | 3 | 7 | 2 | ++ | |
| 65 | 9 | 2 | 8 | 1 | 0 | C. |
| 66 | 3 | 1 | 1 | 4 | 0 | |
| 67 | 8 | 2 | 8 | 0 | ++ | |
| 68 | 5 | 1 | 4 | 0 | ++ | |
| 69 | 3 | 1-3 | 3 | 0 | ++ | |
| 70 | 9 | 1-3 | 6 | 0 | ++ | |
| 71 | 10 | 1-3 | 10 | 10 | 0 | O. |
| 72 | 4 | 1 | 3 | 0 | ++ | |
| 73 | 5 | 2 | 5 | 0 | ++ | |
| 74 | 3 | 1-3 | 4 | 1 | ++ | |
| 75 | 6 | 1 | 6 | 0 | ++ | |
| 76 | 11 | 1 | 9 | 0 | ++ | |
| 77 | 4 | 1 | 4 | 0 | ++ | |
| 78 | 4 | 2 | 3 | 0 | ++ | |
| 79 | 8 | 3 | 8 | 7 | 0 | O. |
| 80 | 8 | 2 | 8 | 1 | ++ | |
| 81 | 3 | 1 | 3 | 0 | ++ | |
| 82 | 10 | 1-3 | 6 | 0 | ++ | |
| 83 | 4 | 2 | 4 | 0 | ++ | |
| 84 | 7 | 2 | 7 | 0 | ++ | |
| 85 | 5 | 1 | 5 | 2 | 0 | O. |
| 86 | 9 | | 9 | 0 | ++ | |
| 87 | 6 | 1-3 | 6 | 0 | ++ | |
| 88 | 7 | 1-3 | 7 | 0 | ++ | |
| 89 | 6 | 1 | 6 | 3 | 0 | O. |
| 90 | 4 | 2 | 4 | 0 | ++ | |
| 91 | 9 | 1 | 5 | 0 | ++ | |
| 92 | 4 | 1 | 4 | 0 | ++ | |
| 93 | 4 | 1-3 | 4 | 0 | ++ | |
| 94 | 4 | 1-3 | 1 | 0 | ++ | |
| 95 | 3 | 2 | 4 | 0 | ++ | |
| 96 | 9 | 1 | 9 | 0 | ++ | |
| 97 | 5 | 1-3 | 5 | 0 | ++ | |
| 98 | 6 | 3 | 2 | 0 | ++ | |
| 99 | 3 | 3 | 4 | 0 | ++ | |
| 100 | 8 | 1-3 | 8 | 2 | ++ | |
| 101 | 4 | 1 | 4 | | | |
| 102 | 5 | 2 | 5 | 5 | 0 | O. |
| 103 | 5 | 2 | 1 | 0 | ++ | |
| 104 | 7 | 1 | 7 | 0 | ++ | |
| 105 | 8 | 2 | 8 | 0 | ++ | |
| 106 | 10 | 1-3 | 9 | 0 | ++ | |
| 107 | 3 | 1 | 3 | 0 | ++ | |
| 108 | 11 | 1 | 2 | 0 | ++ | |
| 109 | 4 | 2 | 4 | 4 | 0 | C. |
| 110 | 15 | 2 | 10 | 0 | ++ | |
| 111 | 3 | 1-3 | 2 | 0 | ++ | |
| 112 | 7 | 3 | 6 | 0 | ++ | |
| 113 | 5 | 2 | 3 | 1 | ++ | |
| 114 | 2 | 2 | 3 | 0 | ++ | |
| 115 | 6 | 1-3 | 5 | 0 | ++ | |
| 116 | 7 | 1-3 | 7 | 0 | ++ | |
| 117 | 9 | 3 | 4 | 0 | ++ | |
| 118 | 3 | 2 | 3 | 0 | ++ | |
| 119 | 4 | 2 | 4 | 0 | ++ | |
| 120 | 8 | 3 | 8 | 0 | ++ | |
| 121 | 5 | 3 | 5 | 0 | ++ | |
| 122 | 7 | 2 | 6 | 0 | ++ | |
| 123 | 4 | 3 | 4 | 0 | ++ | |
| 124 | 6 | 2 | 5 | 0 | ++ | |
| 125 | 8 | 2 | 7 | 0 | ++ | |
| 126 | 3 | 3 | 4 | 0 | ++ | |
| 127 | 7 | 3 | 7 | 0 | ++ | |
| 128 | 4 | 2 | 3 | 0 | ++ | |
| 129 | 5 | 3 | 5 | 0 | ++ | |
| 130 | 4 | 2 | 4 | 1 | ++ | |
| 131 | 10 | 2 | 8 | 5 | 0 | C. |
| 132 | 6 | 2 | 6 | 0 | ++ | |
| 133 | 3 | 2 | 5 | 0 | ++ | |
| 134 | 9 | 3 | 9 | 0 | ++ | |
| 135 | 7 | 3 | 7 | 1 | ++ | |

[1] Average number of nitroglycerine tablets used daily.
[2] 1—electrocardiographic changes of coronary insufficiency.
2—old myocardial infarction.
3—hypertension.
[3] Average number of nitroglycerine tablets used daily.
[4] Average number of nitroglycerine tablets daily after the first week on placenta preparation.
[5] The 15 patients for whom no response was obtained were subjected to testing for the following conditions to determine if their ailment was not angina pectoris. The letters opposite the condition are used in the table to indicate the existence of the condition. "O" in the table indicates that these tests were negative.
A—corpulmenale. B—ventricular aneurysm. C—hiatus hernia.

In summary, 135 patients with angina pectoris were treated with the placental extract. 65 patients exhibited electrocardiographic changes of coronary insufficiency and in this group 42 showed evidence of old myocardial infarctions. One capsule was given orally after breakfast, lunch and the evening meal. The improvement was judged by the number of nitroglycerine tablets necessary daily during a control interval; the response to a placebo during a second interval; and the response to the placental preparation as measured by reduced nitroglycerine demand. Each testing period was two to four weeks. Patients were graded: no response, moderate response and excellent response.

A summary of the testing is as follows:

Excellent response ------------------------------------ 104
Moderate response ------------------------------------ 16
No response ------------------------------------------ 15

Of the 15 patients who did not respond, one had a cor pulmonale, two had a ventricular aneurysm and 5 had a hiatus hernia. Of the 16 patients who responded moderately, there was definite relief but not as dramatic as the patients in the first group.

104 patients reported excellent control of the anginal attacks while on one capsule of the placental preparation three times a day. Exercise tolerance was greatly increased and there was no need for nitroglycerine. Nitroglycerine therapy was discontinued in 85% of the patients. The full preventative effect was observed after 5 to 7 days of therapy. There were no untoward effects.

After a few days treatment, the patients who responded excellently to the treatment showed a striking improvement in their general well-being with increased strength and appetite, and their exercise tolerance was greatly increased.

With respect to toxicity, no untoward or side effects were observed, nor was there any hypotensive action observed. There were no complaints of headache, nausea, vertigo or gastric intolerance. There were no effects on the blood, liver, bronchi, gastrointestinal or urinary tracts. There were no visual disturbances. There is no evidence that tolerance is acquired to the placental preparation.

*Examples 2 through 7*

Additional tests were made employing various concentrations of different individual sulfonamide type compounds in the present compositions. Specifically, compositions were prepared containing as sole sulfonamide drug sulfacetamide, sulfamethoxypyridizine and sulfaguanidine (which are representative of the various major categories of sulfonamide drugs).

Each composition was prepared in the same manner as indicated in Example 1 of the previous description, i.e., extraction of placenta, and combining it with the other ingredients of the ultimate composition. In the following tests, in all cases 0.2 kilo of placenta residue (purified) was combined with 2.5 kilo of powdered desiccated undefatted beef liver, and 5 kilos of aspirin. In examples employing "25%" of sulphonamide-type compounds 2.5 kilos of the corresponding sulfonamide compound was employed. Similarly while maintaining all other ingredients at the same level, half as much sulfonamide type compound was employed in those tests employing a 12.5% composition. The placenta residue was prepared in the manner indicated relative to Example 1, and the various ingredients compounded similarly.

The procedure employed in the clinical testing was to first determine the nitroglycerine intake normal to each of the patients tested, to then administer placebos for an interval, and during this interval determine the nitroglycerine tablet intake as previously determined and to then put patients on the composition of the invention for an interval, and to determine reduction in intake of nitroglycerine tablets.

The time on each testing period was 4 weeks: on nitroglycerine tablets, on the sugar placebo, and on the placental preparation.

During all of the test intervals the patients took nitroglycerine tablets as needed. The placebo and the placental preparation were each administered in the form of capsules, and both had exactly the same appearance. Each capsule was 0.3 gram and was administered orally after breakfast, lunch and the evening meal.

The results for the testing are indicated according to the following notation:

RESPONSES

Excellent _____ + +.
Moderate _____ +
None _____ 0

CODE (A) is the average number of nitroglycerine tablets used daily.
(B) Condition:
  1—Indicates electrocardiographic changes of coronary insufficiency.
  2—Old myocardial infarction.
  3—Hypertension.
(C) Average number of nitroglycerine tablets on placebo therapy.
(D) Average number of nitroglycerine tablets after the first week on placental preparation.

*Example 2*

TABLE II.—12½% SULFACETAMIDE COMPOSITION

| Patient | (A) Normal nitroglycerine intake | (B) Condition before test | (C) On placebo therapy | (D) On placenta preparation | Response |
|---|---|---|---|---|---|
| 1 | 7 | 2 | 6 | 0 | + +. |
| 2 | 4 | 1 | 4 | 0 | + +. |
| 3 | 9 | 3 | 8 | 0 | + +. |
| 4 | 3 | 2 | 4 | 1 | 0. |
| 5 | 5 | 2 | 5 | 3 | 0. |
| 6 | 6 | 1 | 4 | 1 | + +. |
| 7 | 8 | 2 | 7 | 0 | + +. |
| 8 | 3 | 1 | 4 | 0 | + +. |
| 9 | 4 | 2 | 5 | 1 | 0. |
| 10 | 5 | 2 | 3 | 0 | + +. |
| 11 | 6 | 3 | 5 | 0 | + +. |
| 12 | 3 | 2 | 4 | 0 | + +. |
| 13 | 6 | 2 | 6 | 0 | + +. |
| 14 | 5 | 1 | 4 | 0 | + +. |
| 15 | 4 | 3 | 4 | 0 | + +. |
| 16 | 5 | 1–3 | 4 | 0 | + +. |
| 17 | 3 | 2 | 3 | 2 | 0. |
| 18 | 9 | 1 | 7 | 5 | 0. |
| 19 | 4 | 1 | 3 | 0 | + +. |
| 20 | 7 | 1 | 6 | 2 | +. |

*Example 3*

TABLE III.—25% SULFACETAMIDE COMPOSITION

| Patient | (A) Normal nitroglycerine intake | (B) Condition before test | (C) On placebo therapy | (D) On placenta preparation | Response |
|---|---|---|---|---|---|
| 1 | 8 | 1–3 | 9 | 1 | + +. |
| 2 | 4 | 3 | 3 | 0 | + +. |
| 3 | 9 | 1 | 7 | 0 | + +. |
| 4 | 4 | 2 | 4 | 0 | + +. |
| 5 | 6 | 1–3 | 5 | 0 | + +. |
| 6 | 5 | 2 | 3 | 3 | 0. |
| 7 | 3 | 2 | 4 | 0 | + +. |
| 8 | 6 | 1 | 4 | 0 | + +. |
| 9 | 7 | 2 | 5 | 0 | + +. |
| 10 | 4 | 2 | 2 | 0 | + +. |
| 11 | 7 | 2 | 6 | 0 | + +. |
| 12 | 6 | 3 | 4 | 3 | 0. |
| 13 | 8 | 1–3 | 7 | 0 | + +. |
| 14 | 5 | 2 | 6 | 4 | 0. |
| 15 | 12 | 3 | 10 | 0 | + +. |
| 16 | 4 | 2 | 4 | 0 | + +. |
| 17 | 5 | 1–3 | 4 | 0 | + +. |
| 18 | 8 | 1 | 7 | 2 | +. |
| 19 | 4 | 1 | 4 | 0 | + +. |
| 20 | 5 | 2 | 5 | 0 | + +. |

*Example 4*

TABLE IV.—12½% SULFAMETHOXYPYRIDIZINE

| Patient | (A) Normal nitroglycerine intake | (B) Condition before test | (C) On placebo therapy | (D) On placenta preparation | Response |
|---|---|---|---|---|---|
| 1 | 12 | 3 | 11 | 0 | + +. |
| 2 | 6 | 1–3 | 7 | 0 | + +. |
| 3 | 4 | 1 | 4 | 1 | +. |
| 4 | 10 | 1 | 9 | 0 | + +. |
| 5 | 8 | 2 | 8 | 0 | + +. |
| 6 | 9 | 2 | 7 | 2 | +. |
| 7 | 3 | 1–3 | 2 | 2 | 0. |
| 8 | 11 | 2 | 10 | 0 | + +. |
| 9 | 4 | 1 | 3 | 0 | + +. |
| 10 | 8 | 1 | 9 | 0 | + +. |
| 11 | 12 | 3 | 11 | 0 | + +. |
| 12 | 7 | 1–3 | 6 | 5 | 0. |
| 13 | 4 | 1 | 4 | 0 | + +. |
| 14 | 5 | 1 | 3 | 1 | +. |
| 15 | 8 | 2 | 7 | 0 | + +. |
| 16 | 6 | 3 | 5 | 0 | + +. |
| 17 | 4 | 3 | 4 | 0 | + +. |
| 18 | 10 | 2 | 8 | 5 | 0. |
| 19 | 8 | 2 | 7 | 0 | + +. |
| 20 | 3 | 1 | 2 | 0 | + +. |

Example 5

TABLE V.—25% SULFAMETHOXYPYRIDIZINE

| Patient | (A) Normal nitroglycerine intake | (B) Condition before test | (C) On placebo therapy | (D) On placenta preparation | Response |
|---|---|---|---|---|---|
| 1 | 8 | 2 | 7 | 0 | ++ |
| 2 | 9 | 1 | 10 | 0 | ++ |
| 3 | 6 | 1–3 | 5 | 0 | ++ |
| 4 | 8 | 2 | 5 | 0 | + |
| 5 | 3 | 1–3 | 4 | 1 | 0 |
| 6 | 10 | 2 | 7 | 5 | 0 |
| 7 | 4 | 2 | 5 | 0 | ++ |
| 8 | 5 | 2 | 3 | 1 | + |
| 9 | 5 | 1 | 4 | 0 | ++ |
| 10 | 10 | 2 | 12 | 1 | ++ |
| 11 | 6 | 3 | 6 | 0 | ++ |
| 12 | 9 | 2 | 9 | 0 | ++ |
| 13 | 5 | 1–3 | 4 | 0 | ++ |
| 14 | 8 | 3 | 5 | 0 | ++ |
| 15 | 12 | 2 | 10 | 1 | + |
| 16 | 7 | 1–3 | 5 | 4 | 0 |
| 17 | 3 | 1 | 2 | 0 | ++ |
| 18 | 5 | 1–3 | 5 | 0 | ++ |
| 19 | 3 | 2 | 4 | 0 | ++ |
| 20 | 6 | 3 | 5 | 0 | ++ |

Example 6

TABLE VI.—12½% SULFAGUANIDINE

| Patient | (A) Normal nitroglycerine intake | (B) Condition before test | (C) On placebo therapy | (D) On placenta preparation | Response |
|---|---|---|---|---|---|
| 1 | 7 | 3 | 7 | 0 | ++ |
| 2 | 4 | 1–3 | 4 | 0 | ++ |
| 3 | 3 | 2 | 2 | 0 | ++ |
| 4 | 4 | 1 | 4 | 2 | + |
| 5 | 6 | 1 | 5 | 5 | 0 |
| 6 | 11 | 1 | 10 | 0 | ++ |
| 7 | 9 | 2 | 8 | 1 | ++ |
| 8 | 8 | 2 | 9 | 0 | ++ |
| 9 | 6 | 2 | 4 | 3 | 0 |
| 10 | 5 | 1 | 3 | 0 | ++ |
| 11 | 7 | 2 | 5 | 2 | + |
| 12 | 9 | 2 | 8 | 1 | 0 |
| 13 | 3 | 2 | 3 | 0 | ++ |
| 14 | 6 | 3 | 5 | 0 | ++ |
| 15 | 5 | 1–3 | 6 | 0 | ++ |
| 16 | 5 | 2 | 4 | 0 | ++ |
| 17 | 4 | 3 | 3 | 0 | + |
| 18 | 10 | 3 | 8 | 5 | 0 |
| 19 | 3 | 1 | 2 | 2 | + |
| 20 | 7 | 2 | 5 | 0 | ++ |

Example 7

TABLE VII.—25% SULFAGUANIDINE

| Patient | (A) Normal nitroglycerine intake | (B) Condition before test | (C) On placebo therapy | (D) On placenta preparation | Response |
|---|---|---|---|---|---|
| 1 | 7 | 1–3 | 9 | 6 | 0 |
| 2 | 3 | 3 | 3 | 0 | ++ |
| 3 | 8 | 3 | 6 | 3 | 0 |
| 4 | 5 | 1 | 4 | 0 | ++ |
| 5 | 3 | 3 | 1 | 0 | ++ |
| 6 | 4 | 2 | 4 | 0 | ++ |
| 7 | 9 | 2 | 8 | 0 | + |
| 8 | 10 | 1 | 10 | 2 | ++ |
| 9 | 8 | 1 | 7 | 0 | ++ |
| 10 | 8 | 2 | 8 | 0 | ++ |
| 11 | 6 | 2 | 6 | 0 | ++ |
| 12 | 7 | 1 | 5 | 2 | + |
| 13 | 6 | 1–3 | 6 | 0 | ++ |
| 14 | 9 | 2 | 7 | 0 | ++ |
| 15 | 8 | 1–3 | 8 | 1 | ++ |
| 16 | 10 | 3 | 9 | 0 | ++ |
| 17 | 3 | 3 | 2 | 0 | ++ |
| 18 | 2 | 2 | 2 | 0 | ++ |
| 19 | 6 | 2 | 5 | 0 | ++ |
| 20 | 7 | 1 | 8 | 0 | ++ |

As can be seen from the above tests, Table II illustrates that sulfacetamide containing compositions (12½% strength) gave an excellent response in 70%, a moderate response in 10% and no response in 20% of the cases, whereas a 25% composition of the sulfacetamide gave an excellent response in 85%, a moderate response in 5% and no response in 10% of the cases.

The efficacy of compositions containing sulfacetamide as the sole sulfur component is evidenced, particularly compositions containing about 25% strength (by weight) of the sulfacetamide.

With respect to Tables IV and V the sulfamethoxypyridizine containing composition showed responses of 75% excellent response, 15% moderate response and 10% no response at the 12½% strength; and 85% excellent response, 7% moderate response and 8% no response at 25% strength levels.

Once again the efficacy of the compositions of the present invention wherein the sulfonamide type compound was sulfamethoxypyridizine is evident.

Tables VI and VII illustrate that sulfaguanidine containing compositions of the present invention similarly prove to be valuable in treating the patient. Compositions at 12½% strength showed excellent results in 65% of the cases, moderate response in 15% and no response in 20%, whereas a similar composition containing 25 weight percent sulfaguanidine showed 80% excellent response, 10% moderate response and 10% no response.

As can be seen from the above, the 25% composition appeared to give better clinical response although all of the sulfonamides tested were effective. Further, it is noted that after a few days of therapy the patients who responded excellently showed a striking improvement in their general well being with increased strength and appetite and their exercise tolerance was greatly improved. With respect to toxicity no untoward or side effects were observed after prolonged therapy. There were no complaints of headache or nausea, vertigo or gastric intolerance. There were no effects on the blood, liver, bronchi, gastrointestinal or urinary tracts. There were no visible disturbances. There is no evidence that tolerance is acquired to the placental preparation.

Various modifications will suggest themselves to those skilled in the art. In accordance with the present invention a new composition is taught for the relief of symptoms of angina pectoris, said composition characterized as containing certain sulfonamide type compounds, an extract of placenta and desiccated, undefatted beef liver, and aspirin.

Having described the present invention, that which is sought to be protected is set forth in the following claims.

We claim:

1. A method for making a composition for relief of the symptoms of angina pectoris which comprises: mixing finely ground placenta with an acid extracting mixture which consists substantially of 75% of an alcohol selected from the group consisting of ethyl alcohol and methyl alcohol, and 25% of water by volume at a pH of substantially 2.7, thus dissolving an agent of said placenta in said extracting mixture while maintaining said extracting mixture acid and precipitating proteins which are extracted by said extracting mixture from said placenta by allowing the original extract to stand in the cold for at least 24 hours; separating such proteins to provide a liquid fractional extract which has a clear, straw-yellow color, adding alkaline hydroxide to said liquid fractional extract to produce a clear crystalline precipitate which is insoluble in water at a pH of 7, separating said precipitate, evaporating the resultant filtrate to produce a dry placenta-derived residue; forming an aqueous solution of said residue and adding thereto aspirin, powdered desiccated and undefatted beef liver, and a sulfanamide selected from the group consisting of sulfadiazine, sulfamerazine, sulfamethazine, sulfacetamide, sulfisoxazole, salicylazosulfapyridine, sulfamethoxypyridizine, sulfamethoxypyrimidine, sulfaethylthiadiazole, succinyl sulfathiazole, phthalylsulfathiazole, phthalylsulfacetamide and sulfaguanidine so as to form an aqueous paste, allowing said components to inter-react, and elevating the temperature of said aqueous paste so as to evaporate water therefrom to form a dry residue composition suitable for treatment of angina pectoris.

2. The process of claim 1 wherein 5 to 25 weight percent sulfonamide, 25 to 50 weight percent aspirin, 5 to 25 weight percent beef liver, and 0.25 to 2 weight percent placenta derived residue are employed.

3. A composition for the relief of the symptoms of angina pectoris, said composition being a dry residue of an aqueous paste, said aqueous paste being the reaction product of four ingredients, namely aspirin, powdered desiccated and undefatted beef liver, a sulfonamide selected from the group consisting of sulfadiazine, sulfamethazine, sulfacetamide, sulfisoxazole, salicylazosulfapyridine, sulfamethoxypyridizine, sulfamethoxypyrimidine, sulfaethylthiadiazole, succinyl sulfathiazole, phthalylsulfathiazole, phthalylsulfacetamide and sulfaguanidine, and a placenta derived residue formed as set forth in claim 1.

4. A composition of claim 3 wherein said placenta derived ingredient has a maximum of substantially 10% by weight of inorganic material extracted from said human placenta.

5. The composition of claim 3 which contains 5 to 25 weight percent of sulfonamide, 25 to 50 weight percent aspirin, 5 to 25 weight percent beef liver, and 0.25 to 2 weight percent placenta derived material.

6. The composition of claim 3 wherein a triple sulfonamide powder is employed as the sulfonamide component, said triple sulfonamide powder being a mixture of equal parts by weight of sulfamerazine, sulfadiazine, and sulfamethazine.

7. The composition of claim 3 wherein said sulfonamide is sulfacetamide.

8. The composition of claim 3 wherein said sulfonamide is sulfamethoxypyridizine.

9. The composition of claim 3 wherein said sulfonamide is sulfaguanidine.

10. A method of making a composition for the relief of the symptoms of angina pectoris, which consists in extracting human placentas with an acidified solvent mixture which has a pH of substantially 2.7, said acidified solvent mixture consisting substantially of 75% of methanol and 25% of water by volume and enough sulfuric acid to produce said pH, thus producing an original extract of said placentas which has a solid fraction and a liquid fraction; separating said liquid fraction from said solid fraction; reacting said separated liquid fraction with ammonium hydroxide to produce a precipitate and an alkaline liquid portion; separating said liquid portion from said precipitate; evaporating the solvent of said separated liquid portion to provide a crude dry residue; dissolving one part by weight of said crude residue in substantially 50 parts of water to make an aqueous solution and adding substantially two parts of activated charcoal to said aqueous solution to make a mixture and heating said mixture at substantially 27.5° C. for substantially two hours, then separating the liquid part of the mixture from its solid part, evaporating said liquid part to dryness to provide a purified dry residue; dissolving one part by weight of said purified residue in substantially two parts of water to make an aqueous solution of said purified residue; adding a sulfonamide selected from the group consisting of sulfadiazine, sulfamerazine, sulfamethazine, sulfacetamide, sulfisoxazole, salicylazosulfapyridine, sulfamethoxypyridizine, sulfamethoxypyrimadine, sulfaethylthiadiazole, succinyl sulfathiazole, phthalylsulfathiazole, phthalylsulfacetamide and sulfaguanidine to said aqueous solution in the ratio of substantially 12.5 parts by weight of said sulfonamide powder per unit weight of said purified residue and adding enough water to make a first aqueous paste which has a pH of substantially 4.6; adding powdered aspirin to said first aqueous paste in a ratio of substantially 25 parts by weight of said powdered aspirin per unit of weight of said purified residue, adding enough water to make a second aqueous paste which has a pH of substantially 3.8; adding desiccated and undefatted beef liver powder and water to said second paste to make a third aqueous paste whose pH is substantially 4, the ratio by weight of said beef liver being substantially 12.5 parts of said beef liver per unit of said purified residue; allowing said third aqueous paste to stand at substantially 20° C. to 25° C. during a period of substantially two weeks to provide a stable aqueous paste whose pH is substantially 4; evaporating the water from said stable aqueous paste substantially 45° C. to 55° C. until substantially no odor of acetic acid is perceptible, to produce a substantially dry, pulverizable residue which has a pH of substantially 2.8.

11. The process of claim 1 wherein a triple sulfonamide powder is employed, said triple sulfonamide powder being a mixture of equal parts by weight of sulfamerazine, sulfadiazine and sulfamethazine.

References Cited by the Examiner

Gibson: Lancet, volume 257, pp. 1172–1174, December 24, 1949.

Johnson: Science, volume 116, No. 3017, pp. 456, 457, October 24, 1952.

U.S. Dispensatory, 25th Ed., 1955, pp. 762–764 and 1348.

Cecil: Textbook of Medicine, 9th Ed., 1955, W. B. Saunders Co., Philadelphia, Pa., pp. 1321–1327.

SAM ROSEN, *Primary Examiner.*

J. S. LEVITT, *Examiner.*

L. B. RANDALL, *Assistant Examiner.*